(12) United States Patent
McCord et al.

(10) Patent No.: US 11,592,527 B2
(45) Date of Patent: Feb. 28, 2023

(54) SYSTEMS FOR INCORPORATING LIDAR SENSORS IN A HEADLAMP MODULE OF A VEHICLE

(71) Applicant: Cepton Technologies, Inc., San Jose, CA (US)

(72) Inventors: Mark A. McCord, Los Gatos, CA (US); Jun Pei, Saratoga, CA (US); Liqun Han, Pleasanton, CA (US); Dongyi Liao, Mountain View, CA (US); Wei Wei, Sunnyvale, CA (US)

(73) Assignee: Cepton Technologies, Inc.

( * ) Notice: Subject to any disclaimer, the term of this patent is extended or adjusted under 35 U.S.C. 154(b) by 1030 days.

(21) Appl. No.: 16/268,784

(22) Filed: Feb. 6, 2019

(65) Prior Publication Data

US 2019/0257922 A1   Aug. 22, 2019

Related U.S. Application Data

(60) Provisional application No. 62/710,330, filed on Feb. 16, 2018.

(51) Int. Cl.
*G01S 7/481* (2006.01)
*G01S 17/42* (2006.01)
(Continued)

(52) U.S. Cl.
CPC ........... *G01S 7/4813* (2013.01); *F21S 41/285* (2018.01); *F21S 41/40* (2018.01); *G01S 17/42* (2013.01); *G01S 17/87* (2013.01); *G01S 17/931* (2020.01)

(58) Field of Classification Search
CPC ...... G01S 7/4813; G01S 17/931; G01S 17/42; G01S 17/87; F21S 41/40; F21S 41/285
See application file for complete search history.

(56) References Cited

U.S. PATENT DOCUMENTS 4,203,652 A    5/1980  Hanada
5,465,178 A   11/1995  Nakai et al.
(Continued)

FOREIGN PATENT DOCUMENTS

CN    207037244 U    2/2018

OTHER PUBLICATIONS

Non-Final Office Action dated May 27, 2022 in related U.S. Appl. No. 16/203,422 (44 pages).
(Continued)

*Primary Examiner* — Behrang Badii
*Assistant Examiner* — Jay Khandpur
(74) *Attorney, Agent, or Firm* — Kilpatrick Townsend & Stockton LLP

(57) ABSTRACT

A headlamp module of a vehicle includes a housing including a window, an illumination submodule disposed inside the housing and configured to provide illumination light to be transmitted through the window toward a scene in front of the vehicle, and a first LiDAR sensor disposed inside the housing and laterally displaced from the illumination submodule. The first LiDAR sensor includes one or more laser sources configured to emit laser beams to be transmitted through the window toward the scene, the laser beams being reflected off of one or more objects in the scene, thereby generating return laser beams to be transmitted through the window toward the first LiDAR sensor and one or more detectors configured to receive and detect the return laser beams.

20 Claims, 6 Drawing Sheets

(51) Int. Cl.
*F21S 41/40* (2018.01)
*F21S 41/20* (2018.01)
*G01S 17/931* (2020.01)
*G01S 17/87* (2020.01)

(56) References Cited

U.S. PATENT DOCUMENTS

| | | | |
|---|---|---|---|
| 8,836,922 | B1 | 9/2014 | Pennecot et al. |
| 9,086,273 | B1 | 7/2015 | Gruver et al. |
| 9,917,355 | B1* | 3/2018 | Lee ................. H01Q 21/20 |
| 10,036,958 | B2 | 7/2018 | Furuya et al. |
| 2002/0043561 | A1 | 4/2002 | Tsikos et al. |
| 2002/0135831 | A1 | 9/2002 | Park |
| 2003/0042303 | A1 | 3/2003 | Tsikos et al. |
| 2003/0071124 | A1 | 4/2003 | Tsikos et al. |
| 2003/0080190 | A1 | 5/2003 | Tsikos et al. |
| 2006/0221459 | A1 | 10/2006 | Sagan |
| 2007/0181810 | A1 | 8/2007 | Tan et al. |
| 2012/0057345 | A1 | 3/2012 | Kuchibhotla |
| 2012/0275028 | A1 | 11/2012 | Soskind et al. |
| 2014/0198308 | A1 | 6/2014 | Kim |
| 2015/0025843 | A1 | 1/2015 | Takemura |
| 2015/0131080 | A1 | 5/2015 | Retterath et al. |
| 2015/0177381 | A1* | 6/2015 | Yap ................. F41G 7/008 |
| | | | 356/138 |
| 2017/0235057 | A1 | 8/2017 | Hemenway et al. |
| 2017/0307759 | A1 | 10/2017 | Pei et al. |
| 2017/0314764 | A1 | 11/2017 | Kishikawa et al. |
| 2018/0029641 | A1* | 2/2018 | Solar ................. B60Q 9/007 |
| 2018/0067212 | A1* | 3/2018 | Wilson ................. H04M 1/02 |
| 2018/0095165 | A1 | 4/2018 | Cohen et al. |
| 2018/0348344 | A1 | 12/2018 | Wyrwas et al. |
| 2019/0155126 | A1* | 5/2019 | Pomeranz ............. H01S 3/2391 |
| 2019/0162857 | A1 | 5/2019 | McCord et al. |
| 2019/0162858 | A1 | 5/2019 | McCord et al. |
| 2019/0179015 | A1* | 6/2019 | Raring ................. H01S 5/02251 |
| 2019/0301700 | A1 | 10/2019 | Yamazumi et al. |
| 2020/0301012 | A1* | 9/2020 | Yamamoto ............. G01S 13/867 |
| 2020/0393568 | A1* | 12/2020 | Grosser ................. C08J 7/042 |

OTHER PUBLICATIONS

Supplementary European Search Report dated Jul. 13, 2021 in corresponding European Patent Application No. 18884348.6 (twelve pages).

PCT/US2018/062994, "International Search Report and Written Opinion", dated Apr. 24, 2019, 11 pages.

PCT/US2018/062994, "Invitation to Pay Additional Fees and, Where Applicable, Protest Fee", dated Feb. 28, 2019, 3 pages.

Notice of Allowance dated Oct. 19, 2022 in corresponding U.S. Appl. No. 16/203,422 (twelve pages).

* cited by examiner

SYSTEMS FOR INCORPORATING LIDAR SENSORS IN A HEADLAMP MODULE OF A VEHICLE

CROSS-REFERENCES TO RELATED APPLICATIONS

This application claims the benefit of U.S. Provisional Patent Application No. 62/710,330, filed on Feb. 16, 2018, the contents of which is hereby incorporated by reference in its entirety.

BACKGROUND OF THE INVENTION

LiDAR is a device that measures distance to a target by illuminating the target with a laser beam and measuring a reflected laser beam with a detector. A LiDAR sensor may be used to obtain digital three-dimensional (3D) representations of objects in an environment. LiDAR has been used as 3D sensors for obstacle detection and navigation guidance for autonomous vehicles. Integrating LiDAR sensors in a vehicle may pose technical challenges.

SUMMARY OF THE INVENTION

According to an embodiment of the present invention, a headlamp module of a vehicle is provided. The headlamp module of the vehicle includes a housing including a window, an illumination submodule disposed inside the housing and configured to provide illumination light to be transmitted through the window toward a scene in front of the vehicle, and a first LiDAR sensor disposed inside the housing and laterally displaced from the illumination submodule. The first LiDAR sensor includes one or more laser sources configured to emit laser beams to be transmitted through the window toward the scene, the laser beams being reflected off of one or more objects in the scene, thereby generating return laser beams to be transmitted through the window toward the first LiDAR sensor and one or more detectors configured to receive and detect the return laser beams.

According to another embodiment of the present invention, a headlamp module of a vehicle is provided. The headlamp module includes a housing including a window, an illumination submodule disposed inside the housing and configured to provide illumination light to be transmitted through a first section of the window toward a scene in front of the vehicle, and a first LiDAR sensor disposed inside the housing and laterally displaced from the illumination submodule. The first LiDAR sensor includes one or more laser sources configured to emit laser beams and an emission lens molded in a second section of the window adjacent the first section of the window. The emission lens is configured to collimate and direct the laser beams toward the scene, one or more objects in the scene reflecting the laser beams, thereby generating return laser beams. The first LiDAR sensor also includes a receiving lens molded in the second section of the window. The receiving lens is configured to receive and focus the return laser beams onto a detection plane. The first LiDAR sensor further includes one or more detectors positioned at the detection plane and configured to receive and detect the return laser beams. In an embodiment, the headlamp module further includes a second LiDAR sensor disposed inside the housing and laterally displaced from the illumination submodule and the first LiDAR sensor. An optical axis of the first LiDAR sensor and an optical axis of the second LiDAR sensor are along different directions.

DETAILED DESCRIPTION OF SPECIFIC EMBODIMENTS

For applications of LiDAR sensors in vehicles, the mass market in the automotive industry may require that LiDAR sensors are seamlessly integrated into the body of a vehicle. The headlamp (and tail lamp) modules in vehicles can be potential locations for housing LiDAR sensors. Embodiments of the present invention provide techniques for incorporating LiDAR sensors in a headlamp module of a vehicle.

Figure 1:
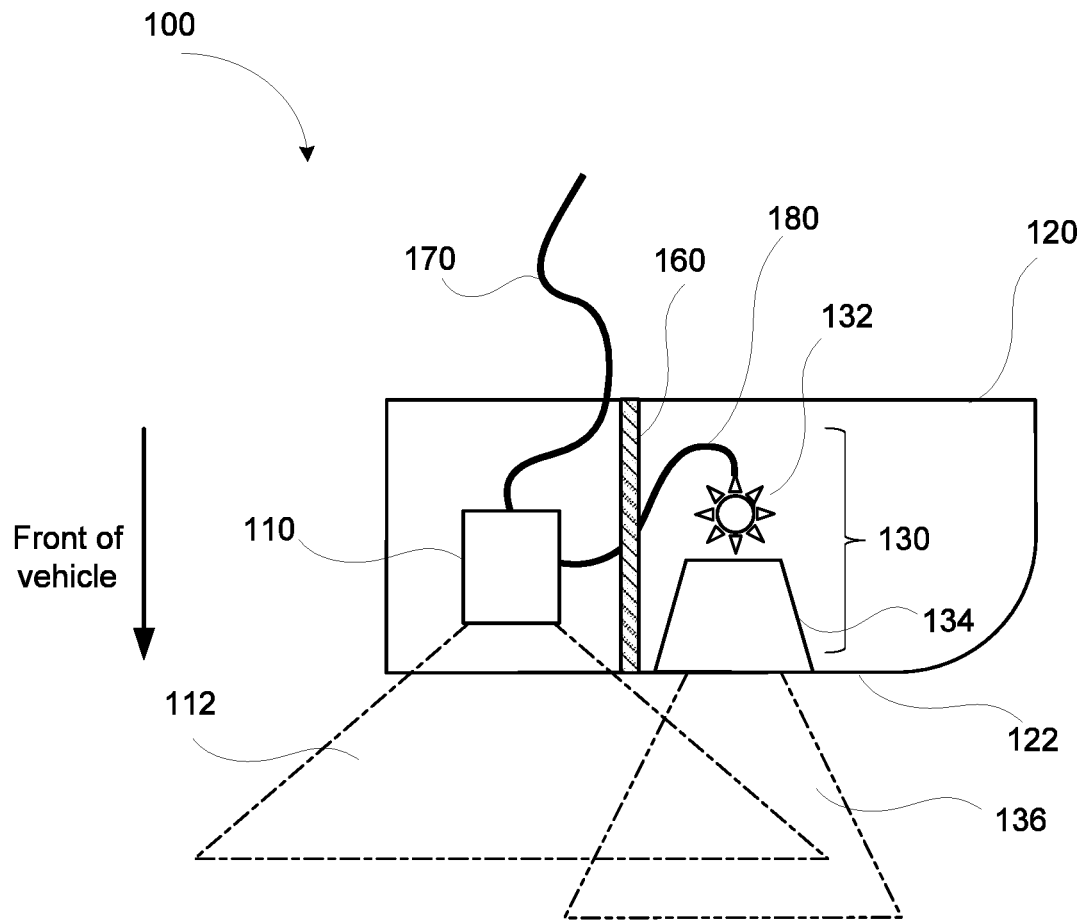
FIG. 1 shows a schematic top view of a headlamp module for a vehicle that includes a LiDAR sensor according to some embodiments.

FIG. 1 shows a schematic top view of a headlamp module 100 for a vehicle that includes a LiDAR sensor 110 according to some embodiments. The term "headlamp module" used herein may refer to a module that includes not only a headlamp for illuminating the road ahead of the vehicle, but also one or more LiDAR sensors disposed in the same enclosure as the headlamp. The headlamp module 100 may be mounted on a front corner of a vehicle body. The headlamp module 100 may include a housing 120. The housing 120 may include a window 122 in a front part of the headlamp module 100. In some embodiments, the window 122 may also extend to a side part of the headlamp module 100. The term "headlamp module" used herein may also refer to a module that includes a tail lamp and one or more LiDAR sensors disposed in the same enclosure as the tail lamp. In such cases, the module may be mounted on a rear corner of the vehicle body.

The headlamp module 100 may include an illumination submodule 130 disposed within the housing 120, and configured to provide headlight for illuminating the road ahead of the vehicle. The illumination submodule 130 may include a lamp 132 configured to emit visible light in the visible wavelength range, such as white light and/or yellow light. For example, the lamp 132 may include light-emitting diode (LED) modules, laser modules, incandescent lamps, halogen lamps, xenon high-intensity discharge (HID) lamps, and the like. The illumination submodule 130 may also include a projection lens 134 disposed in front of the lamp 132 configured to project the light emitted by the lamp 132 toward a scene in front of the vehicle with a certain angular field of view 136. The projection lens 134 may be positioned behind the window 122. The window 122 may be made of a glass or a plastic that is transparent to visible light, so that the light emitted by the lamp 132 may be transmitted therethrough. Alternatively, the projection lens 134 may be molded into the window 122. Additionally, the illumination module 130 may include marker lights for providing turn signals. The lenses for the marker lights may also be molded into the window 122.

The headlamp module 100 includes a LiDAR sensor 110 disposed inside the housing 120 and laterally displaced from the illumination module 130. The LiDAR sensor 110 may include one or more light sources (e.g., laser sources) configured to emit light beams toward a scene in front of the vehicle within a FOV 112. The light beams may be reflected off of the objects within the scene, thereby generating return light beams back toward the LiDAR sensor 110. The LiDAR sensor 100 may further include one or more detectors for detecting the return light beams. In some embodiments, the LiDAR sensor 110 may measure distances to the objects based on the principle of time-of-flight. For example, the light sources may be configured to emit laser pulses. By measuring a round trip time of a laser pulse from emission to detection, a distance to an object may be determined. In some other embodiments, the LiDAR sensor 110 may use continuous-wave laser beams, such as frequency-modulated continuous-wave (FMCW) laser beams, to measure distances.

Figure 2:
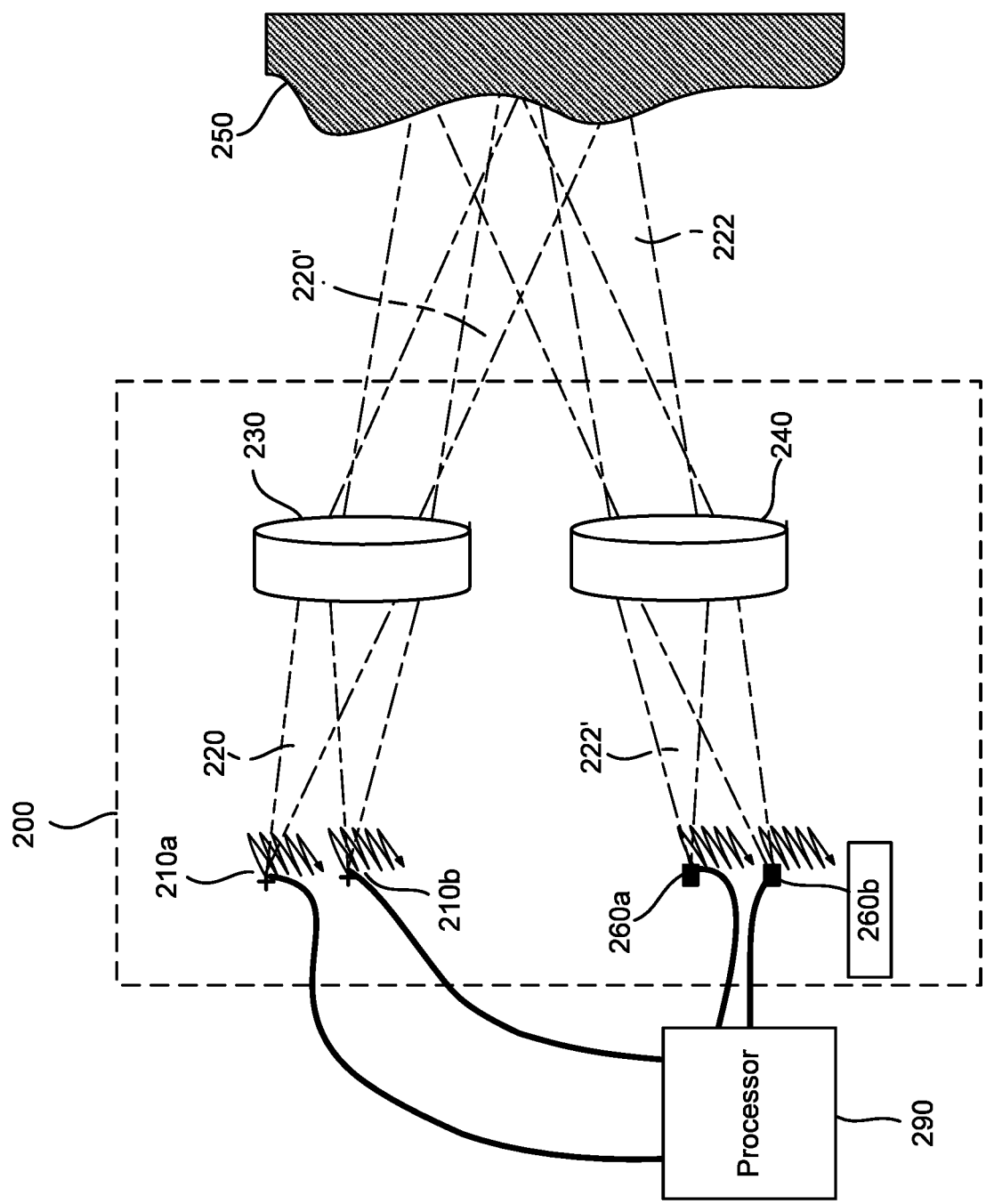
FIG. 2 illustrates schematically a LiDAR sensor according to some embodiments.

FIG. 2 illustrates schematically a LiDAR sensor 200 according to some embodiments. The LiDAR sensor 200 may include an emission lens 230 and a receiving lens 240. The LiDAR sensor 200 may include a laser source 210a disposed substantially in a back focal plane of the emission lens 230. The laser source 210a is operative to emit a laser pulse 220 from a respective emission location in the back focal plane of the emission lens 230. The emission lens 230 is configured to collimate and direct the laser pulse 220 toward an object 250 located in front of the LiDAR sensor 200. For a given emission location of the laser source 210a, the collimated laser pulse 220' is directed at a corresponding angle toward the object 250.

The laser pulse 220 may be reflected off of the object 250, thereby generating a return laser pulse 222 directed toward the receiving lens 240. The receiving lens 240 is configured to focus the return laser pulse 222 onto a corresponding detection location in the focal plane of the receiving lens 240. The focal plane of the receiving lens 240 may be referred herein as the detection plane. The LiDAR sensor 200 may further include a detector 260a disposed substantially at the focal plane of the receiving lens 240. The detector 260a is configured to receive and detect the return laser pulse 222 at the corresponding detection location. The corresponding detection location of the detector 260a is conjugate with the respective emission location of the laser source 210a.

The laser pulse 220 may be of a short duration, for example, 10 ns pulse width. The LiDAR sensor 200 may be coupled to a processor 290. The processor 290 is configured to determine a time of flight (TOF) of the return laser pulse 222. Since the return laser pulse 222 travels at the speed of light, a distance between the LiDAR sensor 200 and the object 250 may be determined based on the determined time of flight.

According to some embodiments, the emission lens 230 and the receiving lens 240 may be fixed. The laser source 210a may be scanned to a plurality of emission locations in the back focal plane of the emission lens 230, and is configured to emit a plurality of laser pulses at the plurality of emission locations. Each laser pulse emitted at a respective emission location is collimated by the emission lens 230 and directed at a respective angle toward the object 250, and incidents at a corresponding point on the surface of the object 250. Thus, as the laser source 210a is scanned within a certain area in the back focal plane of the emission lens 230, a corresponding object area on the object 250 is scanned. The detector 260a is scanned to a plurality of corresponding detection locations in the focal plane of the receiving lens 240. The scanning of the detector 260a is performed synchronously with the scanning of the laser source 210a, so that the detector 260a and the laser source 210a are always conjugate with each other at any given time.

By determining the time of flight for each laser pulse emitted at a respective emission location, the distance from the LiDAR sensor 200 to each corresponding point on the surface of the object 250 may be determined. In some embodiments, the processor 290 is coupled with a position encoder that detects the position of the laser source 210a at each emission location. Based on the emission location, the angle of the collimated laser pulse 220' may be determined. The X-Y coordinate of the corresponding point on the surface of the object 250 may be determined based on the angle and the distance to the LiDAR sensor 200. Thus, a 3D image of the object 250 may be constructed based on the measured distances from the LiDAR sensor 200 to various points on the surface of the object 250. In some embodiments, the three-dimensional image may be represented as a point cloud, i.e., a set of X, Y, and Z coordinates of the points on the surface of the object 250.

In some embodiments, the LiDAR sensor 200 may include multiple laser sources disposed as an array at the back focal plane of the emission lens 230, so that a larger total AFOV may be achieved while keeping the scan range of each individual laser source relatively small. Accordingly, the LiDAR sensor 200 may include multiple detectors disposed as an array at the focal plane of the receiving lens 240, each detector being conjugate with a respective laser source. For example, the LiDAR sensor 200 may include a second laser source 210b and a second detector 260b, as illustrated in FIG. 2. In other embodiments, the LiDAR sensor 200 may include four laser sources and four detectors, or eight laser sources and eight detectors. In one embodiment, the LiDAR sensor 200 may include 8 laser sources arranged as a 4×2 array and 8 detectors arranged as a 4×2 array, so that the LiDAR sensor 200 may have a wider angular field of view (FOV) in the horizontal direction than its FOV in the vertical direction. According to various embodiments, the total FOV of the LiDAR sensor 200 in the horizontal direction may range from about 60 degrees to about 120 degrees, depending on the focal length of the emission lens, the scan range of each laser source, and the number of laser sources.

In some other embodiments, the laser sources 210a and 210b, as well as the detectors 260a and 260b, may be fixed, while the emission lens 230 and the receiving lens 240 are scanned synchronously with respect to each other in a plane substantially perpendicular to the optical axis of the LiDAR sensor 200. In some further embodiments, the laser sources 210a and 210b, the detectors 260a and 260b, the emission lens 230, and the receiving lens 240 are all scanned simultaneously. For example, a first board that carries the laser sources 210a and 210b and the detectors 260a and 260b may be scanned in the horizontal direction, and a second board that carries the emission lens 230 and the receiving lens 240 may be scanned in the vertical direction, effectively creating a two-dimensional scan. As another example, both the first board and the second board may be scanned in two-dimensions synchronously with respect to each other, such that they move in opposite directions at any instant of time. In such cases, the effective scanning range may be increased. In addition, a momentum of the first board may also substantially cancel a momentum of the second board, thereby reducing vibrations of the LiDAR sensor 200. One of ordinary skill in the art would recognize many variations, alternatives, and modifications.

Referring again to FIG. 1, in some embodiments, the light sources in the LiDAR sensor 110 may be configured to emit light beams in infrared (IR) wavelength ranges (e.g., a near IR wavelength range from about 750 nm to about 3000 nm). For example, the light sources and the detectors in the LiDAR sensor 110 may operate at wavelengths of about 850 nm, 905 nm, or 1550 nm. In order to maintain a high detection range for the LiDAR sensor 110, it may be desirable that the light beams incur minimal loss of energy due to reflection or absorption by the window 122 of the headlamp module 100. In some embodiments, the window 122 may be made of a material that has a relatively high transmittance in the operating wavelength range of the LiDAR sensor 110. For example, the window 122 may be made of fused silica, BK7, sapphire, or the like, which transmit both visible and IR light.

In some embodiments, the window 122 may include an anti-reflective coating for the operating wavelength range of the LiDAR sensor 110. The anti-reflective coating may be applied to the entire window 122, or may be applied to a section of the window 122 directly in front of the LiDAR sensor 110. The anti-reflective coating may be configured to produce relatively high transmittance values and relatively low reflectance values in the operating wavelength range of the LiDAR sensor 110. For example, the anti-reflective coating may include multilayer thin film structures with alternating layers of contrasting refractive indices, in which the layer thicknesses are chosen to produce the desired high transmittance values and low reflectance values in the operating wavelength range of the LiDAR sensor 110.

In some embodiments, the anti-reflective coating may include metasurface structures. A metasurface is an optically thin subwavelength structured interface. Metasurfaces are generally created by assembling arrays of miniature, anisotropic light scatterers (that is, resonators such as optical antennas). The spacing between antennas and their dimensions are much smaller than the wavelength. On account of Huygens principle, the metasurfaces may be able to mold optical wavefronts into arbitrary shapes by introducing spatial variations in the optical response of the light scatterers. The resonant wavelength of a metasurface can be engineered by changing the geometric sizes of its constituent structures, thereby providing wavelength selectivity.

Since the LiDAR sensor 110 may include sensitive receiver circuitries whose operations may be adversely affected by background light of other wavelengths outside the operating wavelength ranges of the LiDAR sensor 110, it may be desirable to reduce such background light. According to some embodiments, a section of the window 122 directly in front of the LiDAR sensor 110 may be treated to reflect and/or absorb wavelengths outside the operating wavelength range of the LiDAR sensor 110. For example, the anti-reflective coating may be designed to produce relatively low transmittance values in the visible or ultraviolet wavelength ranges, in addition to producing high transmittance values in the operating wavelength range of the LiDAR sensor 110.

Figure 3:
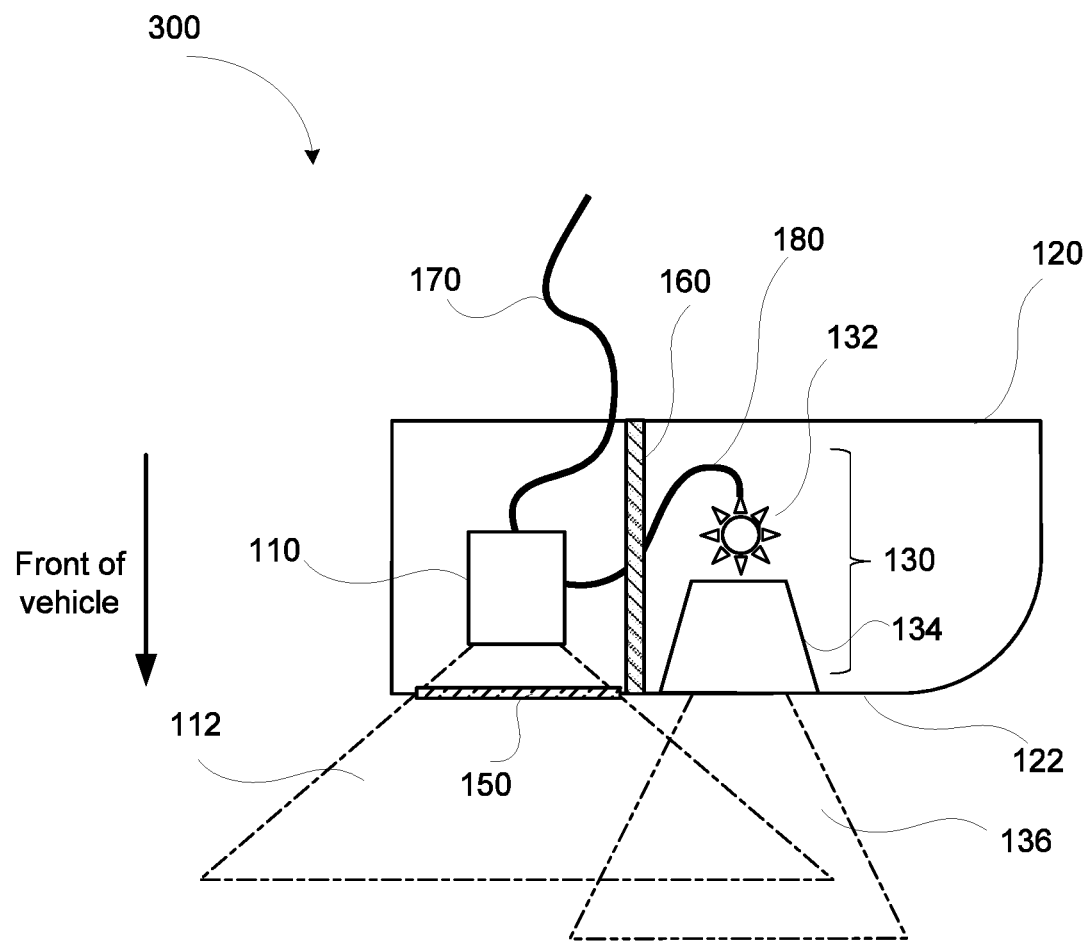
FIG. 3 shows a schematic top view of a headlamp module for a vehicle that includes a LiDAR sensor according to some other embodiments.

FIG. 3 shows a schematic top view of a headlamp module 300 for a vehicle that includes a LiDAR sensor 110 according to some other embodiments. The headlamp module 300 is similar to the headlamp module 100 illustrated in FIG. 1, and further includes a IR transmissive window 150 molded into a section of the window 122 directly in front of the LiDAR sensor 110. For example, the IR transmissive window 150 may be made of a material that has relatively high transmittance values in the near IR (NIR) wavelength range. For example, calcium fluoride, fused silica, magnesium fluoride, BK7, potassium bromide, sapphire, sodium chloride, zinc selenide, and zinc sulfide have relatively high transmittance values in the NIR wavelength range. Since IR transmissive materials may be more expensive than ordinary window materials (e.g., plastic materials), it may be advantageous to have the IR transmissive window 150 that is relative small and covers only the section of the window 122 in front of the LiDAR sensor 110.

In some embodiments, the IR transmissive window 150 may include an anti-reflective coating for the NIR wavelength range. The IR transmissive window 150 may further include a high reflectance coating for wavelengths outside the operating wavelengths of the LiDAR sensor 110 to prevent or reduce background light caused by the illumination submodule 130 or sunlight. For example, the high reflectance coating may be configured to produce relatively high reflectance values in the visible and/or ultraviolet wavelength ranges. In such cases, the IR transmissive window 150 may appear as colored. In some embodiments, the IR transmissive window 150 may be configured to absorb light in the visible and/or ultraviolet wavelength ranges. In such cases, the IR transmissive window 150 may appear as opaque. Thus, embodiments of the present invention provide implementations in which the IR transmissive window 150 is transparent at IR wavelengths, but is not transparent (e.g., reflective, absorptive, or combinations thereof) at visible wavelengths, which can be helpful in avoiding interference from the headlamp module or from sunlight.

Referring to FIGS. 1 and 3, to prevent or reduce adverse impact on the LiDAR performance by the light emitted by the illumination submodule 130, the headlamp module 100 or 300 may further include a baffle 160 disposed between the illumination submodule 130 and the LiDAR sensor 110 according to some embodiments. For example, the baffle 160 may comprise an opaque wall dividing the space within the enclosure 120 into two compartments, wherein the illumination module 130 and the LiDAR sensor 110 are disposed in different compartments. The baffle 160 may include a surface configured to absorb light impinging thereon. For example, the surface of the baffle 160 may be treated to have a rough texture, or may be coated with a light-absorbing film.

Electrical connections may be needed for the LiDAR sensor 110. For example, power may be needed to operate the light sources, the detectors, and the scanning mechanisms in the LiDAR sensor 110. A central processing unit (CPU) may reside somewhere else on the vehicle, and may be configured to control the operation of the LiDAR sensor 110 and to process the electrical signals generated by the LiDAR sensor to construct 3D images of the environment. Thus, electrical signals may need to be transmitted between the CPU and the LiDAR sensor 110. The electrical cables needed for the LiDAR sensor 110 can be expensive, unreliable, and can add to repair cost. Therefore, it may be desirable to avoid having a separate cable or cables for the LiDAR sensor 110. In some embodiments, the electrical connections for the LiDAR sensor 110 may be combined with the electrical cables for the illumination submodule 130.

For example, as illustrated in FIGS. 1 and 3, a master cable harness 170 may be connected to the LiDAR sensor 110. A secondary cable bundle 180 may provide electrical connections between the illumination submodule 130 and the LiDAR sensor 110. The master cable harness 170 may include electrical wires for providing electrical power to both the LiDAR sensor 110 and the illumination submodule 130, as well as for transmitting electrical signals for controlling the operations of the LiDAR sensor 110 and the illumination submodule 130. The LiDAR sensor 110 may act as a master communication device, and may process and deliver electrical power and electrical signals locally to the illumination submodule 130 via the secondary cable bundle 180. The operation of the illumination submodule 130 may include, for example, turning the lamp 132 on or off, switching between high beam and low beam, or operating turn signals.

In some embodiments, the communications between the LiDAR sensor 110 and the CPU may be achieved via high-frequency signals carried over the power wires. In such cases, the number of electrical wires may be reduced to as few as two, one for the power and one for the ground. In some further embodiments, a wireless communication protocol may be used for the communications between the LiDAR sensor 110 and the CPU.

In some embodiments, more complex communications between the LiDAR sensor 110 and the illumination submodule 130 may be performed. For example, the illumination submodule 130 may be controlled to focus the illumination light on some objects of interest identified by the LiDAR sensor 110. As another example, the illumination submodule 130 may be controlled for dynamic pointing, such as following curves of a road, or following a steering wheel position. In some embodiments, the LiDAR sensor 110 and the illumination submodule 130 may be controlled synchronously. For example, the LiDAR sensor 110 and the illumination submodule 130 may be controlled to follow curves of a road simultaneously. This may maximize both the illumination and sensing capabilities along the path of the vehicle.

For autonomous vehicle applications, a LiDAR sensor may need to cover a rather wide angular field of view (FOV), for example as wide as 180 degrees. It may be challenging to design a single LiDAR sensor that can provide such a wide FOV. According to some embodiments, two or more LiDAR sensors may be fitted in a headlamp module to provide a desired combined FOV.

Figure 4:
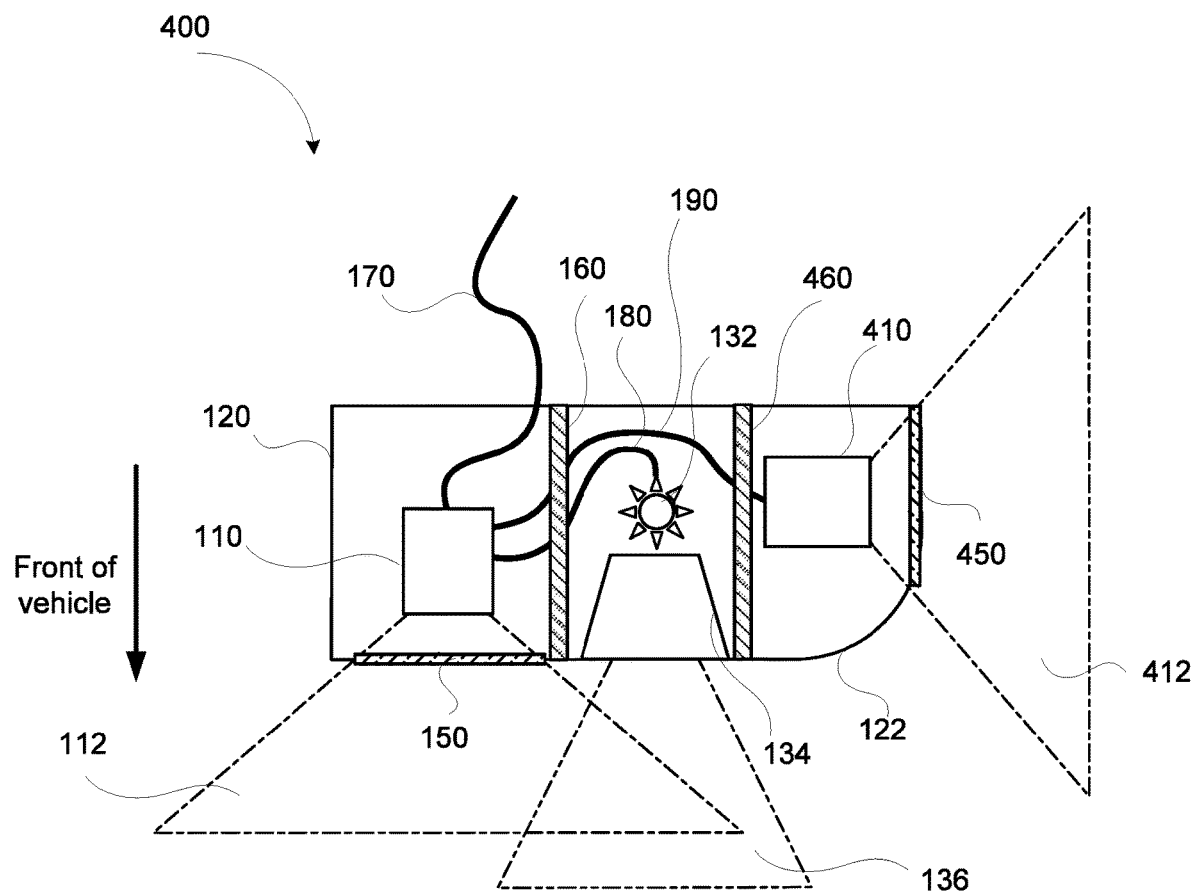
FIG. 4 shows a schematic top view of a headlamp module for a vehicle according to some embodiments.

FIG. 4 shows a schematic top view of a headlamp module 400 for a vehicle according to some embodiments. The headlamp module 400 is similar to the headlamp modules 100 and 300 illustrated in FIGS. 1 and 3, but includes a second LiDAR sensor 410 in addition to the first LiDAR sensor 110. In some embodiments, the second LiDAR sensor 410 may be oriented in a different direction than the first LiDAR sensor 110. For example, the second LiDAR sensor 410 may be oriented substantially orthogonal to the first LiDAR sensor 110.

In some embodiments, as illustrated in FIG. 4, the window 122 may include a front portion in the front part of the headlamp module 400, and a side portion on the side of the headlamp module 400. The first LiDAR sensor 110 may be oriented such that its optical axis points toward the front of the vehicle and is substantially perpendicular to the front portion of the window 122. The second LiDAR sensor 410 may be oriented such that its optical axis points toward a side of the vehicle and is substantially perpendicular to the side portion of the window 122.

The first LiDAR sensor 110 may provide a first FOV 112, and the second LiDAR sensor 410 may provide a second FOV 412. Each of the first FOV 112 and the second FOV 412 may range, for example, from about 60 degrees to about 120 degrees. Thus, the first LiDAR sensor 110 and the second LiDAR sensor 410 may provide a combined FOV that ranges from about 100 degrees to about 240 degrees. In some embodiments, the first FOV 112 and the second FOV 412 may overlap slightly, so that there is no blind spot between the first FOV and the second FOV.

In some embodiments, as illustrated in FIG. 4, the first LiDAR sensor 110 and the second LiDAR sensor 410 may be advantageously disposed on two sides of the illumination submodule 130. This way, interference among the illumination submodule 130 (including marker lights), the first LiDAR sensor 110, and the second LiDAR sensor 410 may be reduced or avoided. A second secondary cable bundle 190 may provide electrical connections between the first LiDAR sensor 110 and the second LiDAR sensor 410.

The headlamp module 400 may include a first baffle 160 separating the illumination submodule 130 and the first LiDAR sensor 110, and a second baffle 460 separating the illumination submodule 130 and the second LiDAR sensor 410.

In some embodiments, the headlamp module 400 may include a first IR transmissive window 150 fitted in the front portion of the window 122 directly in front of the first LiDAR sensor 110, and a second IR transmissive window 450 fitted in the side portion of the window 122 directly in front of the second LiDAR sensor 410.

A LiDAR sensor may require fairly complex lenses. For example, in the LiDAR sensor 200 illustrated in FIG. 2, each of the emission lens 230 and the receiving lens 240 may comprise a composite lens that include multiple lens elements. Multiple reflections from the various lens surfaces may degrade the performance of a LiDAR sensor. Also, the lenses can be one of the more costly components of a LiDAR sensor. According to some embodiments, to improve transmission, reduce reflection, and reduce cost, lenses of a LiDAR sensor may be molded into the window of a headlamp module.

Figure 5:
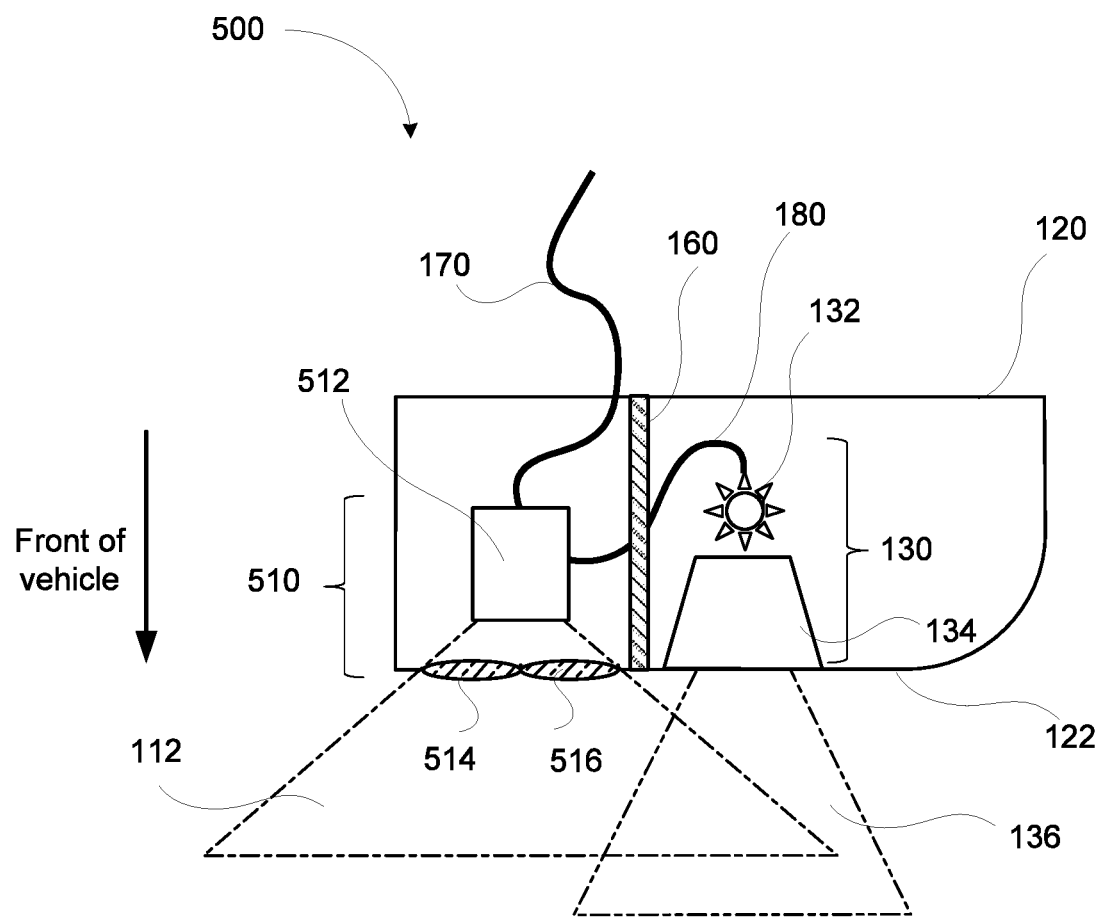
FIG. 5 shows a schematic top view of a headlamp module for a vehicle according to some embodiments.

FIG. 5 shows a schematic top view of a headlamp module 500 for a vehicle according to some embodiments. The headlamp module 500 is similar to the headlamp module 100 illustrated in FIG. 1. It includes a LiDAR sensor 510 disposed next to an illumination submodule 130 inside a housing 120 of the headlamp module 500. The LiDAR sensor 510 may include a first lens 514 and a second lens 516. For example, the first lens 514 and the second lens 516 may be similar to the emission lens 230 and the receiving lens 240, respectively, in the LiDAR sensor 200 illustrated in FIG. 2. The first lens 514 and the second lens 516 are molded into a front portion of the window 122.

The LiDAR sensor 510 may include an optoelectronics submodule 512. The optoelectronics submodule 512 may include one or more laser sources and one or more detectors. The optoelectronics submodule 512 is disposed within the housing 120 directly behind the first lens 514 and the second lens 516. The optoelectronics submodule 512 may also include scanning mechanisms for scanning the one or more laser sources and the one or more detectors relative to the first lens 514 and the second lens 516 to achieve a certain FOV 112, for example as discussed above with reference to FIG. 2.

In order to achieve good performance of the LiDAR sensor 510, the optoelectronics submodule 512 may need to be precisely aligned with respect to the first lens 514 and the second lens 516 to maintain good optical alignment. As discussed above with reference to FIG. 1, the projection lens 134 of the illumination module 130, as well as lenses for marker lights, may also be molded into another portion of the window 122.

Figure 6:
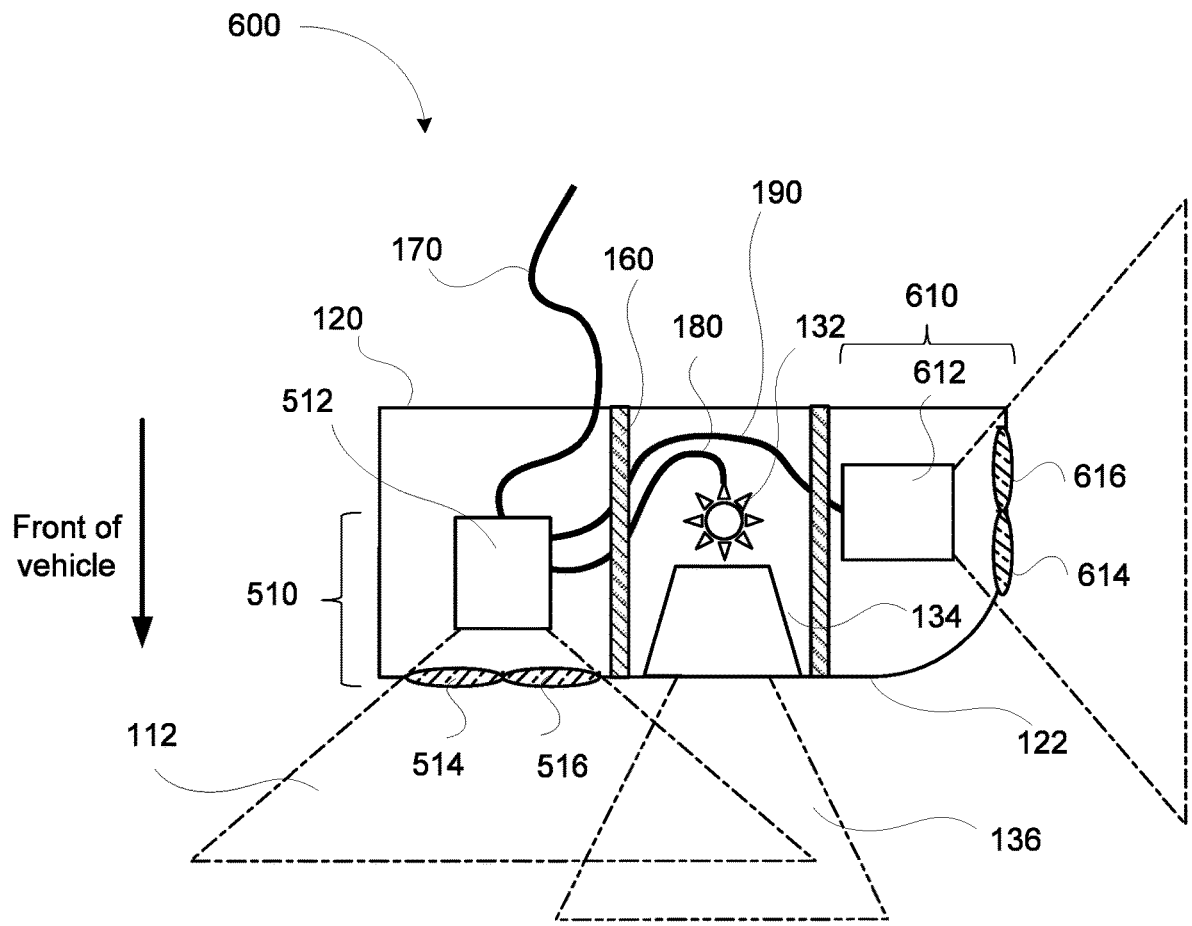
FIG. 6 shows a schematic top view of a headlamp module for a vehicle according to some embodiments.

FIG. 6 shows a schematic top view of a headlamp module 600 for a vehicle according to some embodiments. The headlamp module 600 is similar to the headlamp module 500 illustrated in FIG. 5, but includes a second LiDAR sensor 610 in addition to the first LiDAR sensor 510. In some embodiments, the second LiDAR sensor 610 may be oriented in a different direction than the first LiDAR sensor 510. For example, the second LiDAR sensor 610 may be oriented substantially orthogonal to the first LiDAR sensor 510. Similar to the first LiDAR sensor 510, the second LiDAR sensor 610 includes two lenses 614 and 616 molded into a portion of the window 122 (e.g., a side portion of the window 122). The second LiDAR sensor 610 also includes an optoelectronics submodule 612 positioned directly behind the two lenses 614 and 616.

Both the LiDAR sensor and the illumination submodule may generate a significant amount of heat, which may be trapped inside a headlamp module. Operation of the LiDAR sensor may be impacted at high temperatures. Therefore, it may be desirable to provide some mechanism for controlling the temperature inside the headlamp module. According to various embodiments, thermal control and management may be provided in a headlamp module including a LiDAR sensor. For example, the LiDAR sensor may be mounted on a thermal-conductive mount, which is in turn attached to a heatsink mounted outside the headlamp module. The vehicle frame may be employed as a heatsink.

In some embodiments, additional passive and active cooling devices may be used for thermal management. For example, heat pipes may be used to remove heat from the LiDAR sensor to outside the headlamp module. Alternatively, a thermoelectric cooler (TEC) may be used to cool the LiDAR sensor. In some embodiments, some air from a radiator fan in the vehicle may be diverted over the headlamp module. In cold weather environment, resistive heater elements or thermoelectric heaters may be used to heat the LiDAR sensor or the interior of the headlamp module.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A headlamp module of a vehicle comprising:
a housing including a window;
an illumination submodule disposed inside the housing and configured to provide illumination light to be transmitted through the window toward a scene in front of the vehicle;
a first LiDAR sensor disposed inside the housing and laterally displaced from the illumination submodule, the first LiDAR sensor comprising:
one or more laser sources configured to emit laser beams to be transmitted through the window toward the scene, the laser beams being reflected off of one or more objects in the scene, thereby generating return laser beams to be transmitted through the window toward the first LiDAR sensor; and
one or more detectors configured to receive and detect the return laser beams;
a cable harness connected to the first LiDAR sensor, the cable harness including a first set of electrical wires for providing power to the first LiDAR sensor and the illumination submodule, and for communicating electrical signals to and from the first LiDAR sensor and the illumination submodule; and
a secondary cable bundle connecting the illumination submodule to the first LiDAR sensor, the secondary cable bundle including a second set of electrical wires for providing power to the illumination submodule and for communicating electrical signals to and from the illumination submodule.

2. The headlamp module of claim 1 wherein:
the laser beams emitted by the one or more laser sources comprise light in an infrared (IR) wavelength range; and
the window is transparent for the IR wavelength range.

3. The headlamp module of claim 2 wherein the IR wavelength range is from about 750 nm to about 3000 nm.

4. The headlamp module of claim 2 wherein the window includes an anti-reflective coating for the IR wavelength range.

5. The headlamp module of claim 4 wherein the anti-reflective coating is disposed on a section of the window directly in front of the first LiDAR sensor.

6. The headlamp module of claim 1 further comprising a baffle disposed inside the housing between the illumination submodule and the first LiDAR sensor, wherein the baffle is configured to block light emitted from the illumination submodule from the first LiDAR sensor.

7. The headlamp module of claim 1 wherein:
the laser beams emitted by the one or more laser sources comprise light in an infrared (IR) wavelength range;
the window includes a first section and a second section, the first section being transparent for a visible wavelength range, and the second section being transparent for the IR wavelength range;
the illumination submodule is disposed directly behind the first section of the window so that the illumination light is transmitted through the first section; and the first LiDAR sensor is disposed directly behind the second section of the window so that the laser beams are transmitted through the second section.

8. The headlamp module of claim 7 wherein the second section of the window includes an anti-reflective coating for the IR wavelength range.

9. The headlamp module of claim 7 wherein the second section of the window is not transparent for the visible wavelength range.

10. The headlamp module of claim 1 further comprising a second LiDAR sensor disposed inside the housing and laterally displaced from the illumination submodule and the first LiDAR sensor.

11. The headlamp module of claim 1 further comprising a thermal-conductive mount, wherein the first LiDAR sensor is mounted on the thermal-conductive mount.

12. The headlamp module of claim 1 further comprising an emission lens of the first LiDAR sensor molded in a section of the window.

13. A headlamp module of a vehicle comprising:
a housing including a window;
an illumination submodule disposed inside the housing and configured to provide illumination light to be transmitted through the window toward a scene in front of the vehicle;
a first LiDAR sensor disposed inside the housing and laterally displaced from the illumination submodule, the first LiDAR sensor comprising:
one or more laser sources configured to emit laser beams to be transmitted through the window toward the scene, the laser beams being reflected off of one or more objects in the scene, thereby generating return laser beams to be transmitted through the window toward the first LiDAR sensor; and
one or more detectors configured to receive and detect the return laser beams; and
a second LiDAR sensor disposed inside the housing and laterally displaced from the illumination submodule and the first LiDAR sensor, wherein the illumination submodule is disposed between the first LiDAR sensor and the second LiDAR sensor.

14. The headlamp module of claim 13 further comprising:
a first baffle disposed inside the housing between the illumination submodule and the first LiDAR sensor, the first baffle configured to block light emitted from the illumination submodule from the first LiDAR sensor; and
a second baffle disposed inside the housing between the illumination submodule and the second LiDAR sensor, and second baffle configured to block light emitted from the illumination submodule from the second LiDAR sensor.

15. The headlamp module of claim 13 wherein an optical axis of the first LiDAR sensor and an optical axis of the second LiDAR sensor are along different directions.

16. The headlamp module of claim 15 wherein the optical axis of the first LiDAR sensor and the optical axis of the second LiDAR sensor are substantially orthogonal to each other.

17. The headlamp module of claim 15 wherein:
the window includes a front portion and a side portion;
the optical axis of the first LiDAR sensor is substantially perpendicular to the front portion of the window; and
the optical axis of the second LiDAR sensor is substantially perpendicular to the side portion of the window.

18. The headlamp module of claim 15 wherein each of the first LiDAR sensor and the second LiDAR sensor has an angular field of view (FOV) ranging from about 60 degrees to about 120 degrees.

19. The headlamp module of claim 18 wherein the first LiDAR sensor and the second LiDAR sensor provide a combined FOV ranging from about 120 degrees to about 240 degrees.

20. A headlamp module of a vehicle comprising:
a housing including a window;
an illumination submodule disposed inside the housing and configured to provide illumination light to be transmitted through a first section of the window toward a scene in front of the vehicle; and
a first LiDAR sensor disposed inside the housing and laterally displaced from the illumination submodule, the first LiDAR sensor comprising:
one or more laser sources configured to emit laser beams;
an emission lens molded in a second section of the window adjacent the first section of the window, the emission lens configured to collimate and direct the laser beams toward the scene, one or more objects in the scene reflecting the laser beams, thereby generating return laser beams;
a receiving lens molded in the second section of the window, the receiving lens configured to receive and focus the return laser beams onto a detection plane; and
one or more detectors positioned at the detection plane and configured to receive and detect the return laser beams.

* * * * *